No. 615,754. Patented Dec. 13, 1898.
AUGUST SCHENCK & ADOLPH SCHENCK.
DEVICE FOR KEEPING CONTENTS OF VESSELS BENEATH THE SURFACE OF LIQUID THEREIN CONTAINED.
(Application filed Feb. 2, 1898.)
(No Model.)
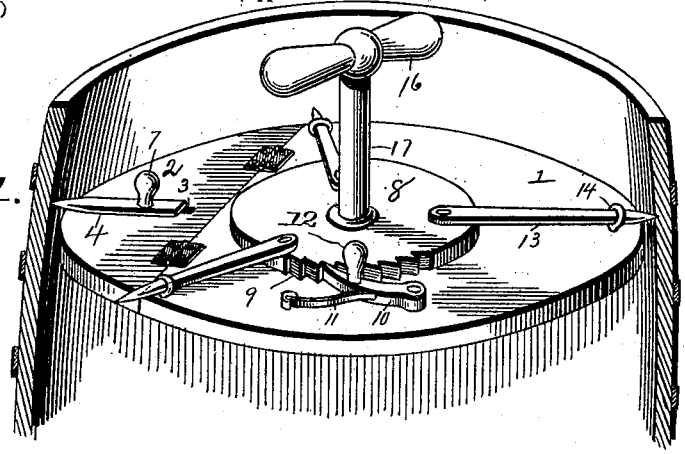
Fig. 1.
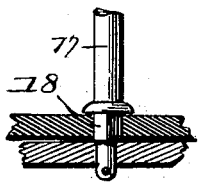
Fig. 3.
Fig. 2.
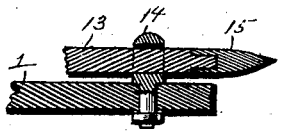
Fig. 4.
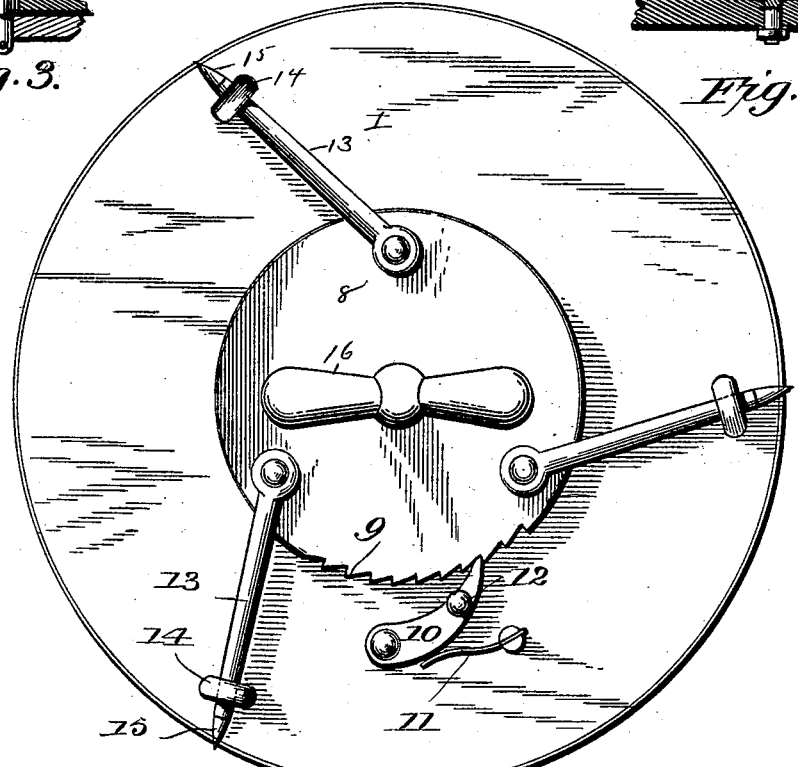
Witnesses:
L. C. Hills
G. E. Warner
Fig. 5.
Inventors:
August Schenck and
Adolph Schenck
By Glanveles&Lee their Attys

UNITED STATES PATENT OFFICE.

AUGUST SCHENCK AND ADOLPH SCHENCK, OF SAN ANTONIO, TEXAS.

DEVICE FOR KEEPING CONTENTS OF VESSELS BENEATH THE SURFACE OF LIQUID THEREIN CONTAINED.

SPECIFICATION forming part of Letters Patent No. 615,754, dated December 13, 1898.

Application filed February 2, 1898. Serial No. 668,877. (No model.)

*To all whom it may concern:*

Be it known that we, AUGUST SCHENCK and ADOLPH SCHENCK, citizens of the United States, residing at San Antonio, in the county of Bexar and State of Texas, have invented certain new and useful Improvements in Devices for Keeping the Contents of Vessels Beneath the Surface of the Liquid Therein Contained; and we do hereby declare the following to be a full, clear, and exact description of the invention, such as will enable others skilled in the art to which it appertains to make and use the same.

This invention has relation to devices adapted to keep pickles, sauer-kraut, &c., beneath the surface of the brine or vinegar in barrels; and it consists in the novel construction and arrangement of its parts, as hereinafter described.

The object of the invention is to provide a device adapted to be secured to the inner sides of a barrel, said device adapted to bear down upon the contents of the barrel and retain the pickles, sauer-kraut, &c., beneath the surface of the brine, vinegar, or other liquid that they are in. At the same time it is the object of the invention to provide a suitable means whereby the contents of the barrel may be easily reached and a portion or all of it removed without dislocating the device from its position with relation to the barrel.

In the accompanying drawings, Figure 1 is a perspective view of a barrel, partly in section, showing the device located therein. Fig. 2 is a top plan view of a modified form of the device. Fig. 3 is a sectional view of the central portion of the device. Fig. 4 is a sectional view of one of the pointed arms and the edge of the device, and Fig. 5 is a sectional view of the means for retaining the hinged section in a horizontal position.

The device consists of a disk 1. The said disk is adapted to rest on the surface of the brine, vinegar, &c., and is made of such material as will not contaminate the said liquid, the material being preferably wood.

In the form of the invention as shown in Fig. 1 the disk 1 is provided with the hinged section 2, said hinged section having an elongated perforation 3, the longitudinal axis of which is substantially in alinement with the radius of the disk 1. The bar 4 is provided on its under side with a point 5. Said point passes through the perforation 3 and is connected at its lower end to the plate 6, the said plate 6 being against the under side of the hinged section 2, the said plate being adapted to close the perforation 3. The bar 4 is provided on its upper side with a handle or knob 7, and the extreme outer end of said bar is pointed. Thus it will be seen that the said bar 4 must be moved longitudinally in alinement with the perforation 3 and that the outer pointed end of said bar may be made to stick into the inner side of the barrel, and thus the said section 2 may be maintained in the same horizontal plane as the disk 1. The disk 8 is concentrically arranged upon the disk 1, the said disk 8 having on its periphery a number of ratchets 9. A pawl 10 is pivoted on the upper side of the disk 1, and the spring 11 bears at one end against said pawl and has a tendency to keep the end of said pawl in engagement with the ratchets 9. The pawl is provided with a suitable handle or knob 12. At suitable intervals the pointed arms 13 are pivoted at their inner ends to the disk 8. The outer ends of said arms 13 pass through suitably-swiveled eyes 14, the said eyes being located upon the disk 1. The extreme outer ends of the said arms 13 are preferably provided with metallic points 15, as shown in detail in Fig. 4. The handle 16 is mounted on the perpendicular shaft 17. The lower end of said shaft is journaled in the disk 1, and the lower portion of said shaft is provided with the squared section 18, that passes through the corresponding perforations in the upper disk 8. Thus as the said shaft 17 is made to revolve the disk 8 must also revolve.

The device is located in the barrel as follows: The disk, with the points of the arms 13 withdrawn, substantially as shown in Fig. 2, is let down through the top of the barrel, and when the disk 1 comes in contact with the surface of the liquid and presses the contents of the barrel below the surface of the liquid the shaft 17 is given a sharp turn, and as the disk 8 revolves the arms 13 are forced out and the points 15 engage and stick into the sides of the barrel, and thus the disk 1 is held in its proper horizontal position. The end of the pawl 10, engaging the ratchets 9, prevents the disk 8 from revolving in the opposite direction. Thus the pointed ends of the arms 13 are maintained in engagement with the sides of the barrel. If it is desired to remove some of the contents of the barrel without disturbing the positions of the disks 1 with relation to the sides of the barrel, the hinged section 2 is swung up and the contents may be removed. After removing, the hinged section is lowered and the pointed end of the bar 4 is forced into the side of the barrel, as above described. When it is desired to remove the disk 1 from the barrel, the end of the pawl 10 is disengaged from the ratchets 9 and the disk 8 is turned and the ends of the arms 13 are withdrawn from the sides of the barrel. The device can then be readily removed or it may be lowered in its position. By swiveling the eyes 14 the said eyes can turn as the arms 13 are thrust out or driven in, and thus the circular motion of the inner ends of the said arms are compensated for and the said arms will not bind in the eyes.

Having thus described our invention, what we claim as new, and desire to secure by Letters Patent, is—

1. A device adapted to keep the contents of barrels beneath the surface of the liquid contained therein, said device consisting of a disk adapted to be attached to the sides of the barrel, a hinged section connected to the side of the disk, a longitudinally-movable bar located on said hinged section, said bar having a handle, the end of said bar being sharpened and adapted to engage the sides of the barrel and maintain the hinged section in the same plane as the disk, a second disk concentrically arranged on the first said disk said second disk having on its periphery a number of ratchets a spring-actuated pawl mounted on the first said disk and adapted to engage the said ratchets, said pawl having a handle, arms pivotally attached at their inner ends to the said second disk, eyes swiveled to the first said disk, said arms passing through said eyes, the outer ends of said arms being sharpened and adapted to engage the sides of the barrel a perpendicular shaft concentrically mounted on the second said disk, a handle located at the upper end of said perpendicular shaft.

2. A device adapted to keep the contents of a barrel beneath the surface of the liquid contained therein, said device consisting of a disk adapted to be attached to the sides of the barrel, a hinged section connected to said disk, said hinged section having an elongated perforation, a longitudinally-movable bar located on said hinged section, a pin connected to the said bar and passing through the elongated perforation, a plate attached to the lower end of said pin and covering the lower end of said perforation, the outer end of said bar adapted to engage the side of the barrel and maintain the hinged section in a stationary position.

In testimony whereof we affix our signatures in presence of two witnesses.

AUG. SCHENCK.
ADOLPH SCHENCK.

Witnesses:
J. EICHOL,
A. WYSOHETZKER.